(12) United States Patent
Kostic et al.

(10) Patent No.: US 7,069,312 B2
(45) Date of Patent: Jun. 27, 2006

(54) NETWORK LOCATION SIGNATURE FOR DISAMBIGUATING MULTICAST MESSAGES IN DUAL-IP STACK AND/OR MULTI-HOMED NETWORK ENVIRONMENTS

(75) Inventors: Igor A. Kostic, Redmond, WA (US); Upshur W. Parks, III, Bothell, WA (US); Jeremy L. Dewey, Redmond, WA (US); Ravi T. Rao, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 768 days.

(21) Appl. No.: 10/313,629

(22) Filed: Dec. 6, 2002

(65) Prior Publication Data

US 2004/0111494 A1   Jun. 10, 2004

(51) Int. Cl.
*G06F 15/177* (2006.01)
(52) U.S. Cl. .................................... 709/220
(58) Field of Classification Search ............ 709/220, 709/218, 225, 229, 249
See application file for complete search history.

(56) References Cited

U.S. PATENT DOCUMENTS

| | | | |
|---|---|---|---|
| 6,571,277 B1* | 5/2003 | Daniels-Barnes et al. ... | 709/213 |
| 6,662,224 B1* | 12/2003 | Angwin et al. ............ | 709/224 |
| 6,665,705 B1* | 12/2003 | Daniels-Barnes et al. ... | 709/203 |
| 6,792,466 B1* | 9/2004 | Saulpaugh et al. ......... | 709/229 |
| 6,868,447 B1* | 3/2005 | Slaughter et al. .......... | 709/225 |
| 6,892,230 B1* | 5/2005 | Gu et al. ................. | 709/220 |
| 6,910,068 B1* | 6/2005 | Zintel et al. .............. | 709/220 |
| 6,970,869 B1* | 11/2005 | Slaughter et al. .......... | 707/10 |
| 6,973,493 B1* | 12/2005 | Slaughter et al. .......... | 709/225 |

OTHER PUBLICATIONS

"Universal Plug and Play Device Architecture", *Version 1.0*, Downloaded from the Internet: 1-52, © 1999-2000 Microsoft Corporation.
"Understanding Universal Plug and Play", *Microsoft Windows® Millennium Edition*: 1-37, © 2000 Microsoft Corporation.
Hinden, et al., "Format for Literal IPv6 Addresses in URL's", *RFC 2732*, © The Internet Society, 1999.

* cited by examiner

*Primary Examiner*—David Y. Eng
(74) *Attorney, Agent, or Firm*—Klarquist Sparkman, LLP (57) ABSTRACT

Dual stack and/or multi-homed devices networked in a device connectivity architecture include a network location signature field in multicast device or service advertisement or announcement messages for recipients to disambiguate announcements of different addresses for the device. The network location signature is a value representing the device's current network configuration (e.g., set of active addresses), and changes with the network configuration. A recipient control point in the device connectivity architecture can then determine whether announcements of different addresses for the device or service are in addition to a previous announced address, or supercedes any previous announced address.

17 Claims, 7 Drawing Sheets

Device Connectivity Software 880

NETWORK LOCATION SIGNATURE FOR DISAMBIGUATING MULTICAST MESSAGES IN DUAL-IP STACK AND/OR MULTI-HOMED NETWORK ENVIRONMENTS

TECHNICAL FIELD

The present invention relates to networking protocols for device connectivity, and more particularly relates to disambiguating device and/or service announcements and other messages in dual protocol stack, multi-homed and like networking environments.

BACKGROUND

Universal Plug and Play (UPnP) is an architecture for pervasive peer-to-peer network connectivity of intelligent appliances, wireless devices, and personal computers (PCs) of all form factors. (See, e.g., "Universal Plug and Play Device Architecture, Version 1.0," Microsoft Corporation (June 2000), and other documents available from the Universal Plug and Play Forum, such as at www.upnp.org on the Internet.) UPnP is designed to bring easy-to-use, flexible, standards-based connectivity to ad-hoc or unmanaged networks whether in the home, in a small business, public spaces, or attached to the Internet. UPnP is a distributed, open networking architecture that leverages TCP/IP and various other Internet/Web technologies to enable seamless proximity networking in addition to control and data transfer among networked devices in the home, office, and public spaces.

UPnP technology is broad in scope in that it targets home networks, proximity networks, and networks in small businesses and commercial buildings. It enables data communication among devices under the command of any device on the network. UPnP technology is independent of any particular operating system, programming language, or physical medium.

The UPnP architecture supports zero-configuration networking and automatic discovery whereby a device can dynamically join a network, obtain an IP address, announce its name, convey its capabilities upon request, and learn about the presence and capabilities of other devices and services. DHCP and DNS servers are optional and are only used if they are available on the network. A device can leave a network smoothly and automatically without leaving any unwanted state information behind.

UPnP uses multicast to send device and service announcements onto the network. In UPnP, a device is conceptually a container of services, and multicasts announcements of each of the services it contains. Accordingly, for expository convenience, the term "device" in this document refers to both devices and services. As a new UPnP-enabled device becomes available on a network, the device sends an announcement that includes an address of the device on the network along with the device's identity. On networks using Internet Protocol, version 4 (IPv4), an address is associated with an interface of a network node (e.g., a computer or other networked computing device). One or more UPnP-enabled devices may be hosted on a network node (such as a PC). A UPnP-enabled device also may exist as a network node independent of any host PC. A Universal Serial Number (USN) uniquely identifies each UPnP-enabled device, whether an independent device or residing on the host. When the address changes, the UPnP device sends another announcement with the same USN but with the new IPv4 address.

In the UPnP device architecture, a Control Point (CP) caches the network address of announced devices. Upon receiving a first multicast announcement with a device's USN, the Control Point stores the network address specified for the device USN in the announcement in a cache entry. As soon as the Control Point (CP) sees a new announcement coming from the same device (same USN) (e.g., after an address change), the Control Point deletes a previous cached entry and stores an entry with the latest network address for the device USN.

In some scenarios, such as where the UPnP device resides on a dual stack and/or multi-homed network node, there may be multiple network addresses associated with the UPnP-enable device. In which case, the UPnP-enabled device may multi-cast announcements with the different network addresses, although its location on the network has not changed. Recent developments in networking and computer usage create an increasing trend towards multi-stack, multi-homed network environments.

For example, many computing devices are now being designed and deployed with support for both Internet Protocol version 6 (IPv6), as well as IPv4. IPv6 is a "next generation" protocol designed by the Internet Engineering Task Force (IETF) to replace the current IPv4 protocol. IPv6 fixes a number of problems in IPv4, such as the limited number of available IPv4 addresses. It also adds many improvements to IPv4 in areas such as routing and network auto-configuration. IPv6 is expected to gradually replace IPv4, with the two coexisting for a number of years during a transition period. During this transition, many network nodes may provide both IPv4 and IPv6 protocol stacks, so that the node can communicate with both IPv4 and IPv6 nodes on its network. Such nodes that provide more than one protocol stack are herein referred to as having "dual stacks." UPnP devices hosted on such nodes generally will send announcements of both its IPv4 address and IPv6 address (es) (so as to announce itself to both IPv4- and IPv6-equipped Control Points).

As another example, some nodes provide multiple interfaces to attach to separate networks or network segments (e.g., an Ethernet adapter for connecting to a local area network (LAN), an IEEE 802.11b (Wi-Fi) card, an adapter for power-line or phone-line home networking, a Bluetooth interface, an IEEE 1394 (Firewire) interface, and etc.). This allows the node to operate simultaneously on multiple network segments, such as a Bluetooth-based "personal area network," a wired LAN or home network, and a commercial wireless network. Such nodes with interfaces to multiple networks or network segments are herein referred to as "multi-homed." In IPv6, as in IPv4, addresses are associated with an interface and not a node itself. In addition in IPv6, there can be numerous addresses associated with an interface, and there could be numerous interfaces associated with a node. Numerous interfaces associated with a node also can be true for multi-homed IPv4 nodes, which will generally have a separate IPv4 address for each interface. UPnP devices hosted on multi-homed nodes generally also will send announcements of the addresses associated with each of its node's interfaces, so as to announce itself to Control Points on each of the networks.

A problem arises with UPnP devices hosted on such multi-homed and/or dual stack nodes, in that UPnP Control Points that also are multi-homed and/or dual stack may receive the announcements of multiple addresses valid across multiple scopes for the UPnP device. The Control Point then is unable to differentiate an announcement sent over a separate network segment or protocol stack versus an announcement sent when the IP address of the UPnP device has changed. In accordance with conventional Control Point behavior, every new announcement therefore is interpreted as representing a device address change, which then causes the Control Point to replace its cached entry for the UPnP device. In a best case scenario, the same UPnP device's announcements sent across different network segments causes annoying flicker at the Control Point, as the Control Point repeatedly replaces its valid cached entries for the UPnP device. (An application user interface (UI) on the Control Point displaying UPnP devices present on the network typically updates with each cache entry added or removed). In some worse case scenarios, the network traffic unnecessarily increases, such as if the Control Point receives an announcement while already in the process of downloading the description document specified by the previous equally valid announcement. This situation can also expose some timing issues and race conditions. The bottom line is that network resources are used unnecessarily, and the user experience suffers.

This problem is not limited to the UPnP device architecture, but also can be encountered in other networking technologies that use multicast for device announcements and/or discovery.

SUMMARY

In accordance with a technique described herein, a field is added to multicast messages to disambiguate whether a device's location has actually changed or there simply are multiple valid network addresses (e.g., due to being dual stack/multi-homed). Again, for expository convenience, the term "device" as used herein refers to a device or a service. In one implementation described herein, this field (called a "network location signature") is a globally unique identifier associated with a set of addresses on which a device is active. The network location signature field of the device remains unchanged so long as this set of addresses remains active. When there is a change to the network configuration (in particular, to the device's set of active addresses), the device changes its network location signature.

The network node includes the network location signature field in its multicast messages, such as device announcements (e.g., discovery advertisements and search responses). Accordingly, when a dual stack/multi-homed node sends device announcements with its active addresses onto different protocol stacks or network segments, the multicast device announcements include the same network location signature. Other devices (e.g., controllers or control points) can then distinguish that the address in the multicast message is an additional active address, and the device's network configuration has not changed. Upon the device's active addresses changing, the device includes a new network location signature associated with the changed set of addresses in its multicast messages. Other devices can then distinguish based on the changed network location signature in the device's multicast messages that the device's network configuration has changed.

With the network location signature field, a controller or control point device creates a cache entry for the device upon receiving a first multicast announcement for the device. The controller or control point can keep this cached entry upon receiving subsequent multicast messages from the device having the same network location signature field, since the initial address remains active. When a multicast message from the device with a changed network location signature is received, the controller or control point replaces the cached entry for the device.

Additional features and advantages of the invention will be made apparent from the following detailed description of embodiments that proceeds with reference to the accompanying drawings.

DETAILED DESCRIPTION

The following description is directed to inclusion of a network location signature to resolve the multicast message ambiguity in multi-stack, multi-homed network environments. The description presents an exemplary application of this technique in a device connectivity architecture or protocol, such as a variation of UPnP employed in a dual-stack (IPv4 and IPv6), multi-homed network environments. However, the network location signature technique is not limited to UPnP, and can be adapted or applied in various other device connectivity architectures and protocols.

1. Device Connectivity Architecture Overview

Figure 1:
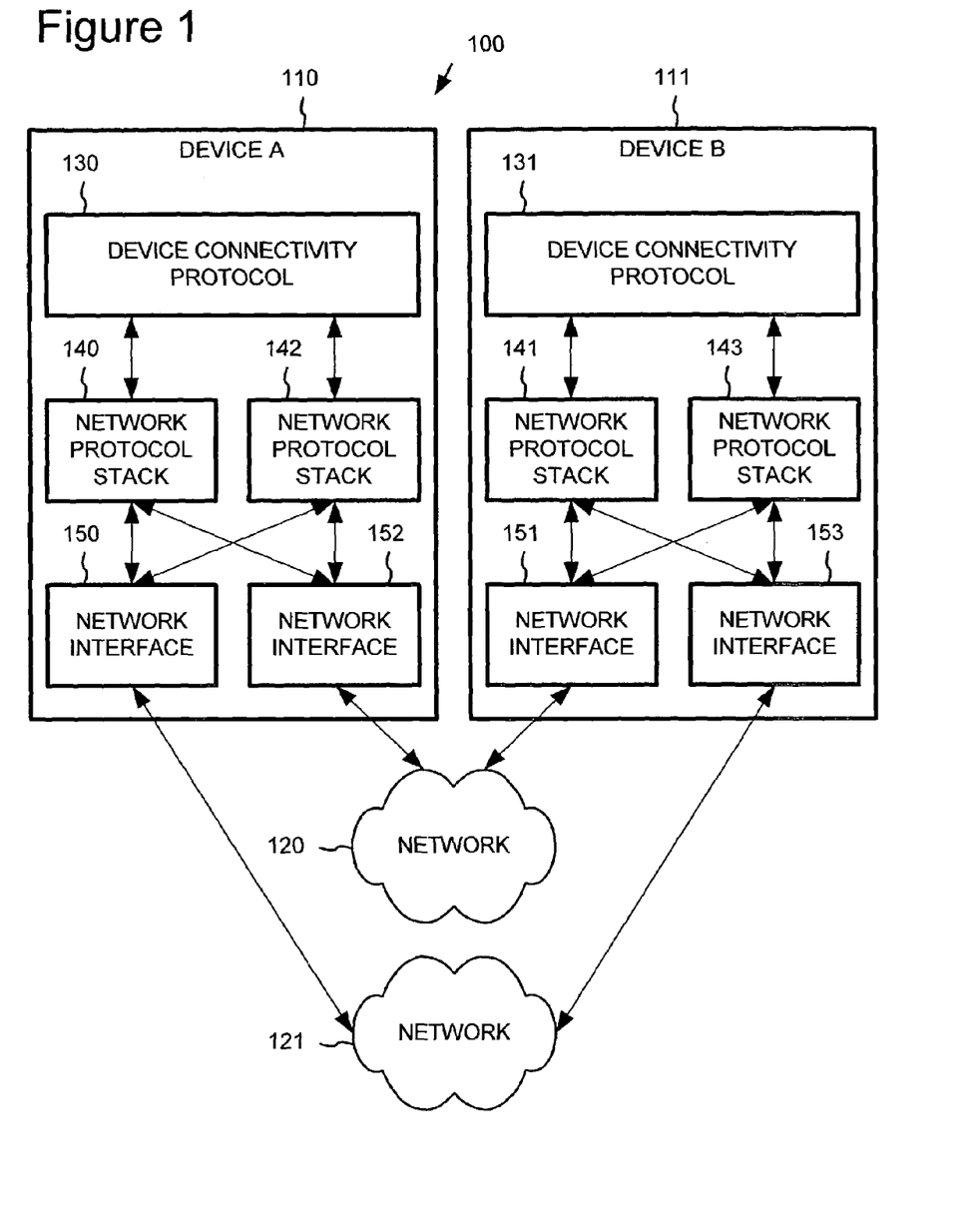
FIG. 1 is a block diagram of dual stack/multi-homed devices in a network device architecture in which a network location signature is used to disambiguate multicast messages.

FIG. 1 illustrates a general device connectivity architecture 100 having dual-stack, multi-homed devices 110–111. In the general device connectivity architecture, the devices 110–111 are networked via one or more networking media 120–121, such as network wiring (e.g., for an Ethernet or other local area network (LAN), a home phone line or power line network, a Firewire (IEEE 1394), universal serial bus (USB), or etc.), fiber optic cabling, wireless transceivers (e.g., for a Bluetooth, Wi-Fi (IEEE 801.11b), or other wireless data network) or the like. The network can encompass a personal area network of devices carried by or worn on a person, a local area network of devices in a locale, or a wide area network (such as the Internet or other geographically dispersed data network). The devices 110–111 can be any variety of device with embedded computing and networking capabilities, including without limitation audio/video or other multimedia recording/transmitting/receiving/or presenting device (broadcast receivers, televisions, video players, cameras, etc.), computers (personal, workstation, server, handheld, laptop, tablet, or other mobile), telephones, office equipment (printers, copiers, scanners, fax), security systems, home appliances (lighting, heating, ventilation, air conditioning, door openers, kitchen appliances, etc.), as a few general examples.

The devices 110–111 each implement a device connectivity protocol 130–131, such as UPnP, via which the devices can interoperate. Devices that expose their functionality to control by other devices via UPnP are termed "controlled devices." On the other hand, devices through which a user interacts via UPnP to control other devices are termed "control points." In the general device connectivity architecture 100, the devices 110–111 can operate as either or both controlled devices and control points. For example, an audio or video player may expose stop/play/fast forward/rewind/skip operations via UPnP, and would be termed a controlled device. The same player could also provide a screen and input buttons for user interaction, and operate as a UPnP control point for its user. In addition, some physical devices (e.g., a personal computer) can operate as a host for multiple logical controlled devices (e.g., a media player, an electronic messaging device, an electronic book reader, etc.), such as may be implemented as software programs running on the computer. As previously mentioned, the term "device" also is used herein to refer to services implemented on a physical device, which are announced in multicast messages.

The devices 110–111 include networking protocol stacks 140–143 for communicating over data networks with other devices. In the general device connectivity architecture 100, the devices 110–111 can include multiple protocol stacks to support communication via multiple networking protocols. For example, each of the devices 110–111 can include an IPv4 networking protocol stack 140–141, and an IPv6 networking protocol stack 142–143. The general device architecture also can include single stack devices that support a single networking protocol, as well as devices that include multiple stacks for any variety or combination of networking protocol, including non-Internet protocols.

The devices 110–111 also include network interfaces 150–153 for interfacing with the networks 120–121. In general, the network interfaces 150–153 are the physical or hardware interfaces to the networks, such as a network interface card (NIC) or adapter for physically interfacing with the network media. The devices also can include various logical interfaces provided over a physical network interface, such as a virtual private network (VPN), unicast, Point-To-Point Tunneling Protocol (PPTP) on a single NIC. With physical interfaces on multiple networks, the devices are present on each of the networks and can interact with other devices on each of the networks (i.e., the devices are multi-homed). For example, a cell phone can have interfaces for interfacing to a commercial wireless data network, as well as to a Bluetooth personal area network or a Wi-fi local area network.

The devices 110–111 can have more than one of the networking protocol stacks 120–121 operating over each network interface 150–153. For example, both IPv4 and IPv6 networking protocols can be bound on each one of the device's NICs.

In circumstances where the device is dual-stack and/or multi-homed, the device can be assigned multiple network addresses. For example, with both IPv4 and IPv6 protocol stacks active on both NICs, the devices 110–111 may each have a set of active network addresses that include an IPv4 address and IPv6 addresses (e.g., IPv6 link local and site local addresses) for each of its NICs. For IPv6, three scopes of unicast addresses are defined for devices, including link-local, site-local and global. Automatic address assignment in IPv6 uses the MAC address of NICs to build link-local unicast addresses. Site-local addresses are built when a router announces the site-local prefix. This ability removes the dependency on the Dynamic Host Configuration Protocol (DHCP), which is generally used in IPv4 networks for automatic local address assignment. Link-local addresses are valid only in link-local scopes and are not propagated by routers. Common UPnP usage scenarios are geared toward home users (home networks, ad hoc networks) and enterprise users (managed networks), and therefore generally use only link-local and site-local addresses. Accordingly, in one implementation, UPnP devices may use IPv6 link-local and site-local addresses.

In the device architecture 100, the devices 110–111 operating UPnP 130–131 over two protocols introduces the possibility that the same device may advertise over both protocols (with its respective address(es) for the protocol), and further that a device operating as a control point under UPnP that also supports the two protocols will receive UPnP advertisements and search response from the device via both protocols. Further, with multiple network interfaces 150–153, the devices 110–111 also may multicast UPnP advertisements separately to both networks, and control points also operating on both networks may receive the devices' advertisements and search response from the respective devices via both networks. Accordingly, devices operating as UPnP control points may receive advertisements of multiple addresses for a same device over separate network interfaces and protocol stacks, creating an ambiguity as to whether a previously advertised address for the device remains active.

2. Network Location Signature

Figure 2:
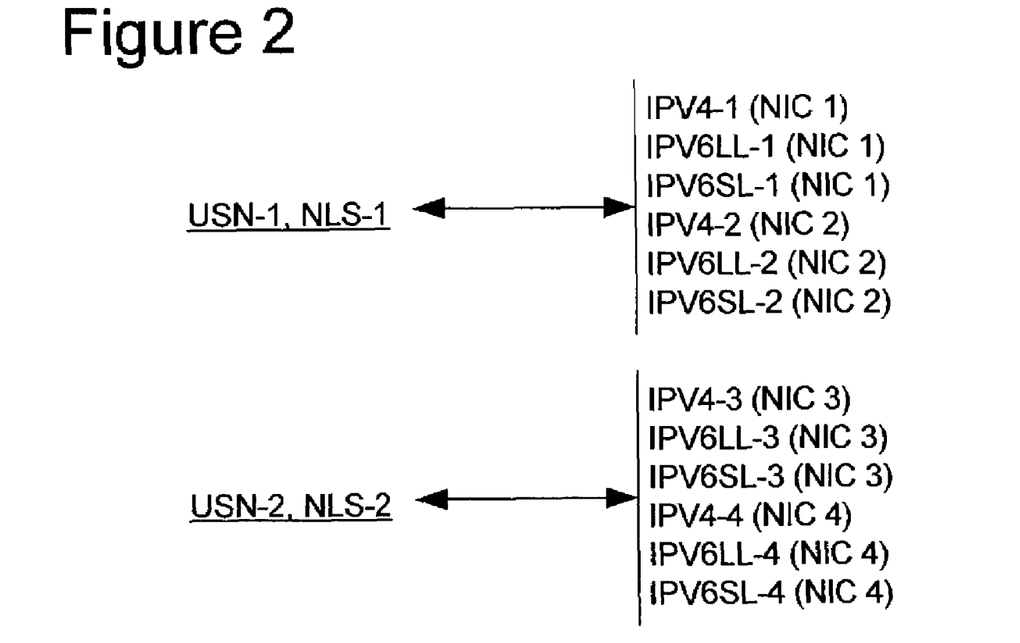
FIG. 2 is a table listing showing sets of active network addresses associated with a network location signature for a device in the device architecture of FIG. 1.
Figure 3:
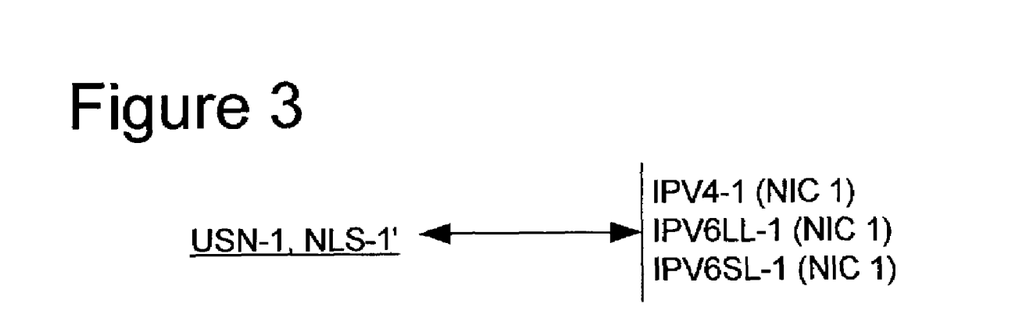
FIG. 3 is a table listing showing a new network location signature associated with a set of active network addresses after a network configuration change in the device architecture of FIG. 1.

With reference to FIG. 2, the device connectivity protocol 130–131 implemented in the dual-stack/multi-homed devices 110–111 (FIG. 1) resolves the ambiguity by including a field (herein termed a "network location signature") in its multicast controlled device advertisements (e.g., in a header field of the device advertisements). The devices use this same network location signature for multicast messages sent on all of its interfaces and stacks, and when advertising any of its addresses. The network location signature field is a value associated with a set of the currently active network addresses for a controlled device. The devices change their network location signature when their network configuration (in particular, their set of active addresses) changes. This enables recipients of the multicast messages to discern whether an advertised address on a separate stack or interface is in addition to its formerly advertised addresses, or is a new address to replace the former address(es).

In one implementation of the invention, the network location signature can be in the form of a hash value computed by the device as a hashing function of its active addresses. In one example, a 128-bit hash value is used for the network location signature. In other implementations, the network location signature can be in the form of a globally unique identifier (GUID), which may be generated in the device using a conventional GUID generator function. In still other implementations, the device can generate the network location signature as the value of a counter, that the device increments on any change in its network configuration.

FIG. 2 illustrates an example of network location signatures associated with a set of active addresses for the devices 110–111. In this example, the device 110 is identified in multicast messages of the device connectivity protocol by a universal serial number (USN), which is shown symbolically in FIG. 2 as USN-1. The device 110 also has a network location signature associated with a current network configuration (set of active addresses) for the device. In this case, the device 110 currently is configured with a set of addresses (six total), including an IPv4 addresses (symbolically shown as IPv4-1 and IPv4-2), and link local and site local IPv6 addresses (symbolically shown as IPv6LL-1, IPv6LL-2, IPv6SL-1 and IPv6SL-2) for each of its interfaces. The device 111 similarly is identified with a USN (symbolically illustrated as USN-2), and has a network location signature-associated with its current network configuration of addresses (symbolically represented as IPv4-3, IPv4-4, IPv6LL-3, IPv6LL-4, IPv6SL-3 and IPv6SL-4devices 110–111 include their respective network location signatures when advertising different of their addresses on separate stacks or interfaces to clarify that their network configuration is unchanged.

Figure 4:
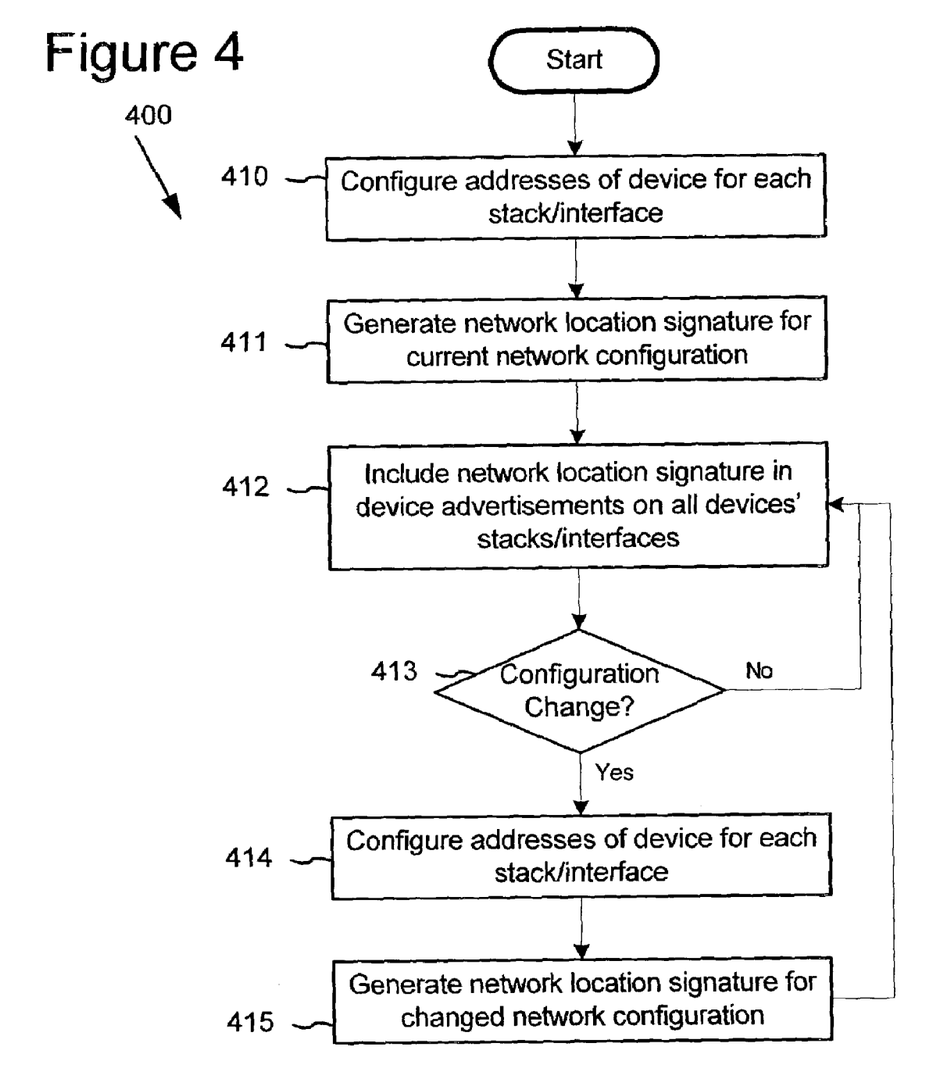
FIG. 4 is a flow diagram of a process of controlled device operation in the network device architecture of FIG. 1 for sending multicast device announcements with a network location signature field.

The devices 110–111 change their network location signature upon any change to their network configuration, such as when any of their addresses change. FIG. 4 illustrates an example where the active address set for the device 110 has changed due to the disconnection of its second NIC, so that the addresses on the second interface (i.e., IPv4-2, IPv6LL-2, and IPv6SL-2 in this example) are no longer valid. The device 110 then generates a new network location signature (NLS-1') to be associated with its new network configuration (i.e., its now active set of addresses, IPv4-1, IPv6LL-1, IPv6SL-1). The device then uses this new network location signature for subsequent device advertisements.

3. General Controlled Device Operation

FIG. 4 illustrates a general method of operation of the devices 110–111 when operating as a controlled device in the general device architecture 100. In general, as shown at action 410, the controlled device first configures addresses for use with the various protocol stacks 140–143 and network interfaces 150–153 of the device on which it resides. The controlled device then generates a network location signature to represent the device's network configuration having the configured set of addresses at action 411.

With the controlled device's addresses having been configured and its network location signature generated, the controlled device is then ready to send multicast device advertisements of its addresses via respective protocol stacks and network interfaces. In these device advertisements, the controlled device includes the network location signature as shown at action 412 to enable control points to disambiguate the controlled device's advertisements of different addresses on separate protocol stacks and network interfaces. As indicated at action 413, the controlled device continues to use the same network location signature so long as the network configuration remains unchanged.

In the case of a change in the controlled device's network configuration, the controlled device reconfigures the addresses for its protocol stacks and network interfaces, as needed, at action 414. At action 415, the controlled device generates a new network location signature to be associated with the reconfigured addresses. The controlled device now uses this new network location signature when sending subsequent device advertisements at action 412.

4. General Control Point Operation

Figure 5:
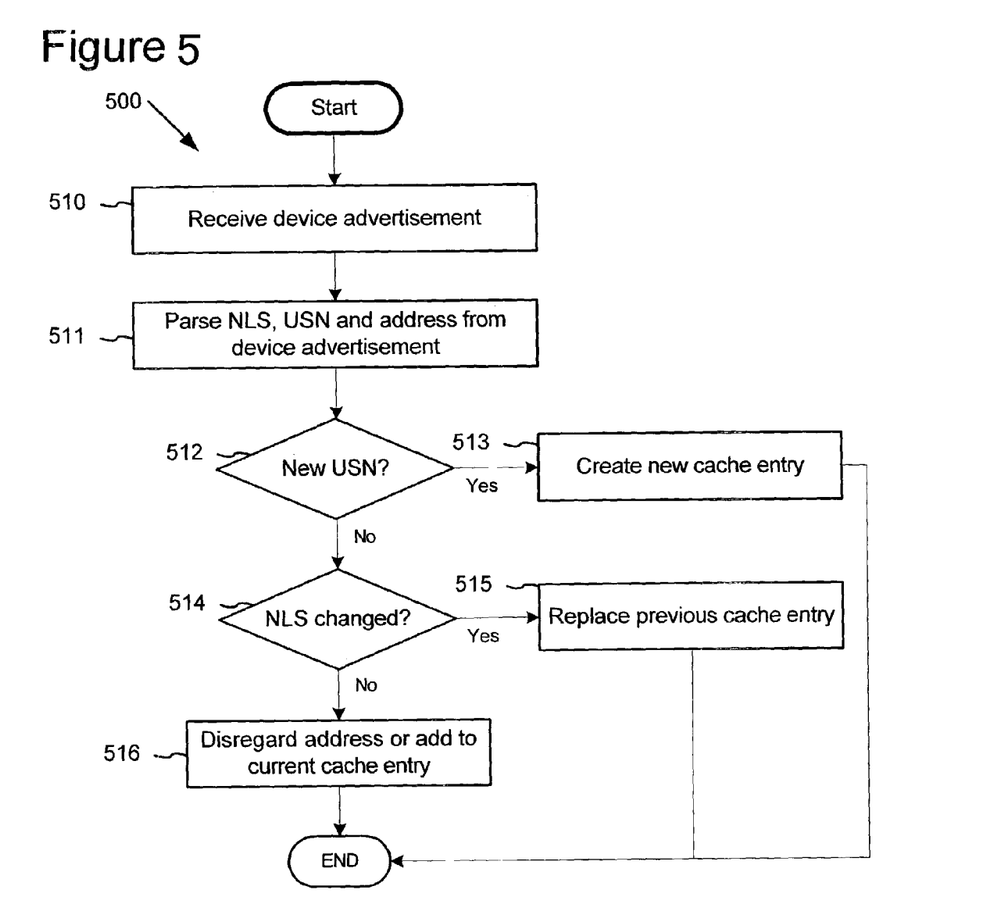
FIG. 5 is a flow diagram of a process of control point operation in the network device architecture of FIG. 1 using the network location signature field to efficiently maintain cached controlled device entries.

FIG. 5 illustrates a general method of operation of the devices 110–111 when operating as a control point in the general device architecture 100. At a first action 510 in this general method 500, the control point device receives a device advertisement multicast from a controlled device (e.g., as per action 412 in the general controlled device operation 400 in FIG. 4). The device advertisement includes a network location signature, device identifier (such as the universal serial number in the UPnP protocol) and address for the controlled device, which the control point device parses from the multicast messages at action 513.

The control point device then checks its cache entries for an entry having the parsed device identifier (e.g., USN) at action 512. If this is the first device advertisement received with the device identifier, the control point creates a new cache entry at action 513 for the controlled device, where the control point device stores the device's network location signature and address.

If the control point device already has a cache entry for the device identifier, the control point device checks whether the network location signature in the newly received device advertisement matches that in the cache entry (which was received in a previous advertisement from the controlled device) at action 514. If the network location signature has changed, indicating the controlled device's network configuration changed since the last device advertisement received from that controlled device, then the control point device replaces the prior cache entry at action 515. The replacement cache entry stores the network location signature and address received in the current device advertisement, and deletes addresses received from any prior device advertisements of the controlled device.

Otherwise, if the network location signature remains unchanged, the control point device can disregard the address in the newly received device advertisement at action 516. The control point device can continue using the address previously stored from a previous device advertisement from the controlled device, because the unchanged network location signature indicates that the controlled devices' network configuration has not changed since the previous device advertisement received from that controlled device. Alternatively, where the address in the current device advertisement differs from that in the control point device's cache entry for the controlled device, the control point device can store this address as an additional address for the controlled device.

The control point device performs this general operation method 500 again upon receiving further multicast device advertisements from controlled devices over any of its protocol stacks and network interfaces.

After the general operation method 500, the control point device can access the controlled device (e.g., in description, presentation or control phases of the device connectivity protocol) using the address or addresses stored in control point device's cache entry for the controlled device. If the control point device stores additional advertised addresses for a controlled device instead of disregarding at action 516, the control point device can select an appropriate one of the addresses in the cache entry to access the controlled device.

5. UPnP Implementation

In one exemplary implementation, the device connectivity architecture 100 (FIG. 1) employs UPnP as the device connectivity protocol, on devices that may have IPv4 and IPv6 protocol stacks and one or more network interfaces.

In this implementation, the UPnP device connectivity protocol supports link-local addresses and scopes via IPv6 stacks as its default configuration. Accordingly, the UPnP device connectivity protocol 130–131 of the devices listens and broadcasts its simple service discovery protocol (SSDP) announcements on a link-local scope multicast address on the IPv6 protocol stack (e.g., [FF02::C]). Further, this UPnP implementation provides the ability to support subnet scope ([FF03::C]), administrative scope ([FF04::C] and site-local scope ([FF05::C]) on the IPv6 protocol stack. If a higher scope is selected, the device supports the higher scope in addition to the link-local scope. The UPnP implementation can use scooping of IPv6 addresses to control the propagation of UPnP messages instead of relying on a "Hop Limit" (similar to the TTL limit in IPv4). In this UPnP implementation, the Hop Limit is set to 255, and the routers on the networks 120–121 decide how far to propagate the message.

The exemplary UPnP implementation also provides the ability to select which interface or interface each device or host uses for UPnP connectivity. If not configured, all interfaces are included by default. In the case of multiple logical devices being hosted on a device host (e.g., multiple software-implemented devices hosted on a personal computer), the interface and scope choices may apply to the device or to the device host. For example, multiple logical devices on a device host may have a same selection of interfaces.

The exemplary UPnP implementation includes the network location signature as a field in SSDP message headers for announcements. The device sends its current network location signature in this NLS field in announcements on every interface on which it is active, and changes its network location signature value whenever its network configuration changes.

Link-local Scope

Link-local scope is the default mode for the exemplary UPnP implementation over the IPv6 networking protocol. The device chooses the set of link-local addresses to be used. The default value is one link-local address per interface. In case more than one link-local address is available for any particular interface, the device selects one for that interface; devices should endeavor to use the same address as previously used if possible.

Site-local Scope

In the exemplary UPnP implementation of the device connectivity architecture 100, a human administrator for the network and/or devices explicitly configures the devices 110–111 for site-local support. The administrator specifies the scope in which UPnP devices are to be active. If the scope is not specified, the default value will be to use link-local scope only.

If site-local scope support is specified, the device attempts to obtain a site-local address during initialization by sending a router solicitation message and then executing a site-local address configuration sequence. Unless a particular subset of interfaces is specified, UPnP 130–131 communicates on all interfaces. If more than one site-local address is available on any particular interface, or across a set of interfaces, and they are all valid in the same site for the specified scope, then UPnP selects one for all specified interfaces; devices should endeavor to use the same address as previously used if possible. If site-local addresses belong to two or more different sites, then UPnP selects one site-local address for each site and computes a separate NLS for addresses belonging to each site.

The devices send up to three announcements per interface, one using the IPv4 address, the second using the link-local IPv6 address, and the third using the site-local address.

Controlled Device Operation

In the exemplary UPnP implementation of the device connectivity architecture 100, the dual-stack devices 110–111 advertise as controlled devices using the same device identifier or universal serial number (USN) on both IPv4 and IPv6 protocol stacks 140–143 only if the device description document and presentation resources of the respective controlled device are substantially identical on both protocols. If there is any difference in the behavior of the controlled device beyond the base URL when operating on IPv6 versus IPv4, the controlled device should be advertised as two separate devices with separate USNs. (The base URL is a uniform resource locator (URL) specified in the device's description document, and serves as a base to which the names of other resources in the description document are appended to yield the URLs at which those respective resources can be retrieved. In the event that the description document does not specify the base URL for the device, then the value of the location field in the SSDP header (described below) is used as the base URL for the device's resources.) The device determines the services to be advertised on different addresses. For example, advertising a schema for an Internet Gateway Device on IPv6 addresses may not be useful, in which case the device does not advertise via the IPv6 protocol stack even where hosted on a physical device with dual stacks.

Control Point Operation

In cases where the dual-stack, multi-homed devices 110–111 operate as a control point, the control point may receive advertisements of different addresses for a single UPnP controlled device sent over multiple network interfaces. Where a controlled device advertises on multiple networks, multiple addresses, or multiple interfaces, the control points that receive these multiple advertisements preferably displays the controlled device only once in their control point user interface.

When acting as a UPnP control point, the devices 110–111 rely on the NLS and USN fields of SSDP advertisements from a controlled device to identify and discard duplicate advertisements. If the values of the NLS and USN fields match in advertisements of different addresses, the control point determines that the subsequently advertised address is in addition to the previous advertised address of the device. The control point can cache multiple addresses for a controlled device advertised with matching NLS and USN field values, or discard the additional addresses. Further, the control point can use any of the advertised addresses advertised with matching NLS and USN fields to access the respective controlled device, such as to retrieve its device description or presentation page, or communicate control commands. Upon receiving a further advertisement from the controlled device with a matching USN value and different NLS field value, the control point determines that the network configuration of the controlled device has changed, and replaces the cached address for that controlled device with the address specified in the newly received advertisement.

Accordingly, regardless of which network interface or stack, from what address, and how many announcements a control point receives, the control point is able to unambiguously determine that they belong to the same device. This improves the user experience by eliminating unnecessary "flicker" of the control point user interface that can occur when the device display is updated.

Upon receiving a "device bye-bye" communication from a controlled device on either IPv4 or IPv6 stacks, the control point removes its cache entry for the controlled device from its cache.

Addressing

In the exemplary UPnP implementation, UPnP 130–131 on the devices 110–111 may support addressing by the IPv4 or IPv6 networking protocol stacks 140–143, or both. In most devices, the addressing will likely be performed by the IPv6 stack and do not require any programming in the UPnP device connectivity protocol layer 130–131.

In the exemplary UPnP implementation, UPnP controlled devices and control points support the following IPv6 addresses and ports:

One link-local unicast address per interface
One site-local unicast addresses per site (if a router is present)
A unicast loopback address [::1] for the loopback interface
A node-local scope all-nodes multicast address [FF01::1]
A link-local scope all-nodes multicast address [FF02::1]
One or more multicast addresses for joined groups [FF0X::C].

The devices also support the SSDP defined multicast address: [FF0X::C]:1900. [FF0X::0:0:0:0:0:0:C] is an IANA-allocated, variable scope, multicast address reserved for SSDP.

Ports used by UPnP 130–131 in IPv4 are reused in IPv6. UPnP also uses the same SSDP multicast port assignment of 1900. Alternative implementations may use other port values.

Figure 6:
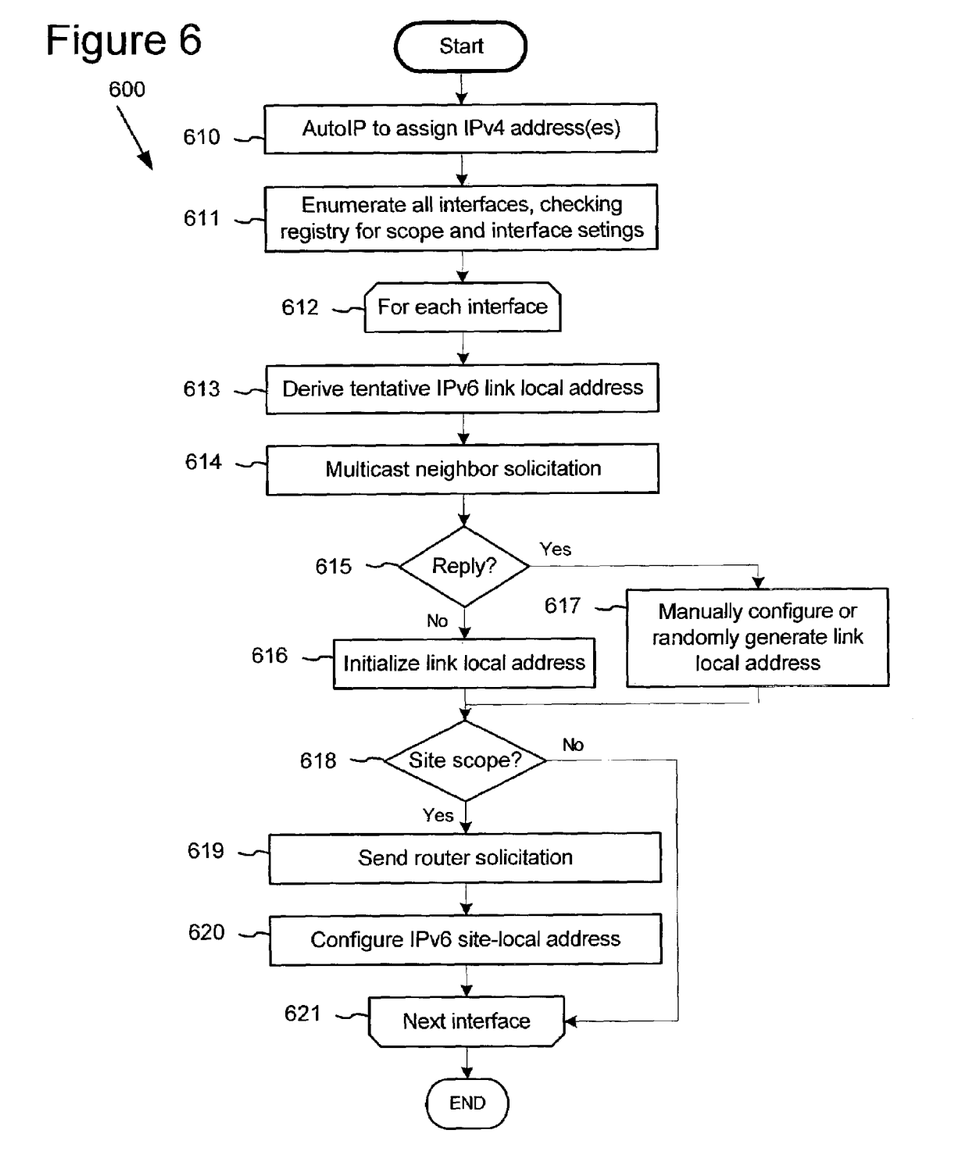
FIG. 6 is a flow diagram of an addressing method at start or boot up of a device in an exemplary UPnP implementation of the network device architecture of FIG. 1.

FIG. 6 illustrates a general boot/startup method of configuring addresses for the devices 110–111 in the exemplary UPnP implementation of the device connectivity architecture 100.

At indicated at action 610 during start-up/boot-up of the UPnP device, the UPnP device begins initializing IPv4 and/or IPv6 addresses for its protocol stacks/network interfaces.

At action 611, the UPnP device configures IPv4 addresses for its network interface using the Auto-IP addressing, as described (inter alia) in "Universal Plug and Play Device Architecture, Version 1.0," Microsoft Corporation (June 2000). With Auto-IP addressing, a domain name server (DNS) is not required to be present on the network. The Auto-IP addressing thus permits the UPnP device to configure its IPv4 address on ad-hoc networks, such as in home settings where a domain name server is not present.

At action 612, for IPv6 addressing, the UPnP device enumerates through all its interfaces, and checks the registry for scope and interface settings. The UPnP device then proceeds to automatically configure the IPv6 addresses for the interfaces in actions 612–621 according to these scope and interface settings. As indicated in actions 612, 621, the UPnP device repeats the actions 613–620 separately for each interface.

At action 613, the UPnP device derives a tentative IPv6 link-local address (FE80::/64+64 bit Interface ID) for the current interface. The UPnP device then sends a multicast neighbor solicitation to ensure uniqueness of this tentative link-local address. As indicated at actions 615, 616, the UPnP device configures the tentative address as its IPv6 link-local address on the interface if no reply to the multicast neighbor solicitation is received. However, if a reply is received, the IPv6 auto-configuration sequence stops and manual configuration is normally performed. Alternatively, the UPnP may provide for attempting to configure randomly-generated addresses as the IPv6 link-local address on the interface.

If site-local scope is specified for the UPnP device in the scope settings, The UPnP device then attempts to obtain a site-local address at actions 618–620. The UPnP device sends a router solicitation message over the interface at action 619. In some UPnP device implementations, the action 619 can be performed prior to the neighbor solicitation at action 614 to optimize address auto-configuration performance. The UPnP device then executes the site-local address configuration sequence per the IPv6 networking protocol with the router.

Discovery

For the discovery phase in the exemplary UPnP implementation, the UPnP device connectivity protocol 130–131 in the devices 110–111 sends device advertisements of IPv4 and/or IPv6 addresses for the controlled devices. These device advertisements are a modified form of the device advertisements described in "Universal Plug and Play Device Architecture, Version 1.0," Microsoft Corporation (June 2000), in that the location field can contain an IPv6 address as well as IPv4 addresses. Further, the device advertisements include a new network location signature field. The IPv6 addresses sent in discovery messages (including those in discovery messages, the <URLBase> element of the device description, and HTTP and GENA HOST headers) generally are literal addresses formatted according to R. Hinden, B. Carpenter, and L. Masinter, "Format for Literal IPv6 Addresses in URL's," RFC 2732, The Internet Society (1999). The network location signature field is added in message headers of simple service discovery protocol (SSDP) messages to allow control points to recognize when a message received on a different protocol or address is referring to the same device as opposed to a being a new advertisement from a device whose address has changed.

Advertisement

For IPv6 addresses, the controlled devices operating under UPnP 130–131 on the devices 110–111 advertise according to the following guidelines:

Controlled devices send SSDP announcements to [FF0X::C]:1900. Control points listen to these addresses and ports to detect when new devices are available on the network.

The SSDP LOCATION header contains the URL of the root device description document. Typically, a literal address is used. When multiple IPv6 addresses are available, UPnP chooses one in link-local scope per interface and one in site-local scope per host for each site.

The controlled devices advertise one link-local address for each interface

The controlled devices advertise one site-local address for each unique site per host.

Global addresses are not advertised.

For both IPv4 and IPv6 announcements, the new SSDP NLS extension header field contains a "signature" of the current state of host addresses used by UPnP. The same NLS value is sent in all advertisements and search responses sent by the device; this allows a control point to use the NLS field, in addition to the USN field, to recognize the announcements as originating in a single device regardless of the network, address, or protocol over which the announcements were sent.

The SSDP HOST header typically contains a literal IPv6 address, formatted according to R. Hinden, B. Carpenter, and L. Masinter, "Format for Literal IPv6 Addresses in URL's," RFC 2732, The Internet Society (1999), followed by a port without using the bracket plus colon notation. In the LOCATION field, an IPv6 address is contained within brackets if a port is specified. The examples below incorporate this syntax.

An example of a device advertisement of an IPv6 address for a controlled device has the following form:
NOTIFY * HTTP/1.1
HOST: [FF05::C]:1900
CACHE-CONTROL: max-age=1600
LOCATION: http://[FEC0::1]:80/desc.xml
OPT: "http://schemas.upnp.org/upnp/1/0/"; ns=01
01-NLS: network location signature
NT: search target
NTS: ssdp:alive
SERVER: OS/version UPnP/1.0 product/version
USN: advertisement UUID Listed below are details for the altered and added header fields appearing in the listing above. In the example listed above and others throughout this section, HTTP header values are case sensitive.

HOST. The "HOST" header field is a required field in the exemplary UPnP implementation. The multicast address and port are registered for SSDP by Internet Assigned Numbers Authority (IANA). For IPv6, an address is of the form [FF0X::C]. This is a variable scope multicast address where X is changed to represent the appropriate scope. For example, where a scope of 2 is used for link local, a device advertising on the local link would use an address [FF02::C]. The port defaults to 1900; it is 1900 if provided.

LOCATION. The "LOCATION" header field is a required field in the exemplary UPnP implementation. This is a single URL to the root device description, specified by the UPnP device vendor. For IPv6, the URL uses a host address valid within the current scope (the address or scope on which the announcement is being sent).

OPT and NLS. The "OPT" and "NLS" fields are required in the exemplary UPnP implementation for IPv6, and for IPv4 if the device is also being advertised over IPv6. This is defined by the HTTP Extension Framework. The NLS header contains a string value which changes whenever the network configuration of the device changes (e.g., if any of the assigned or calculated IP addresses change). A GUID can be conveniently used as the value of the NLS header field for this purpose, since UPnP devices already have the ability to generate GUIDs. Alternatively, other techniques for generating the NLS field value are possible. In the exemplary UPnP implementation, the NLS value is at least 1 and no more than 64 bytes in length. The OPT header field is used because it is technically possible for a control point to function without recognizing the header, although the user experience will be less than optimal (and existing IPv4 control points will not recognize it).

Advertisement: Device Unavailable

When a device and its services are going to be removed from the network, the device should multicast an "ssdp:byebye" message corresponding to each of the "ssdp:alive" messages it previously multicasted that have not already expired. Similarly, if an interface change notification is received after an announcement, the device should cancel existing advertisements. An example of such "ssdp:byebye" message is as follows:
NOTIFY * HTTP/1.1
HOST: [FF05::C]:1900
OPT: "http://schemas.upnp.org/upnp/1/0/"; ns=01
01-NLS: network location signature
NT: search target
NTS: ssdp:byebye
USN: advertisement UUID Furthermore, the devices should remember their prior IP addresses in the event that some or all of their addresses have changed. If that is the case, new advertisements have to be sent, using the same sequence described above.

Search

When a control point is added to the network, it sends a multicast search request ("M-SEARCH") on the IPv4, IPv6 or both stacks 140–143. By default, searches are sent only in link-local scope on all interfaces; searches may also be sent on one or more of the site-local scopes. Aside from using an IPv6 multicast address, the M-SEARCH search request messages are unchanged from the format described in "Universal Plug and Play Device Architecture, Version 1.0," Microsoft Corporation (June 2000). An example of an M-SEARCH message has the following syntax.
M-SEARCH * HTTP/1.1
HOST: [FF05::C]:1900
MAN: "ssdp:discover"
MX: seconds to delay response
ST: search target The search messages do not contain the NLS field. In alternative implementations of the device connectivity architecture 100, the NLS field can be added to search messages in order to reduce the multicast traffic and have the devices respond only once to the search request message even if sent by the control point over multiple addresses, networks, or interfaces. However, this alternative implementation adds complexity in the controlled device to cache and compare NLS values from control points, which contradicts the design objective that the controlled devices have minimal state or are stateless.

Response

To be found, a controlled device sends a response to the source IP address and port of the control point that sent the search request to the multicast channel.

In the exemplary UPnP implementation, responses by the controlled device to the search request message are intentionally parallel to advertisements, and as such, follow the same pattern as listed for NOTIFY with ssdp:alive (above), including the NLS header field. The only difference is the NT header, which is an ST headerhere. An example search response is sent in the following format.
HTTP/1.1 200 OK
CACHE-CONTROL: max-age=1600
DATE: 20 Apr. 2002
EXT:
LOCATION: http://[FEC0::1]:80/desc.xml
OPT: "http://schemas.upnp.org/upnp/1/0/"; ns=01
01-NLS: network location signature
NT: search target
NTS: ssdp:alive
SERVER: OS/version UPnP/1.0 product/version
USN: advertisement UUID

EXAMPLE

Figure 7:
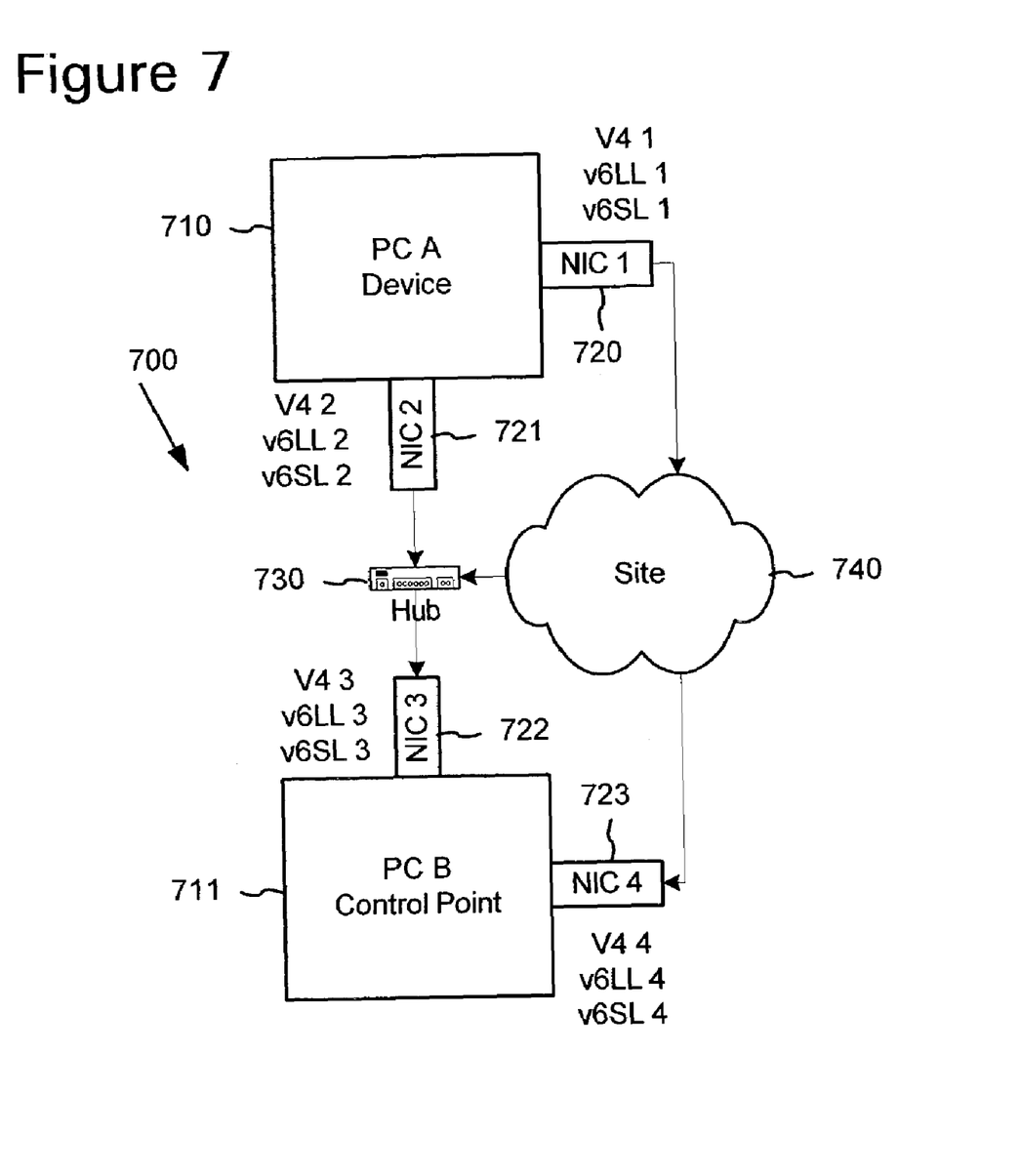
FIG. 7 is a block diagram of an example of dual stack/multi-homed devices according to the UPnP implementation of the network device architecture.

To illustrate the exemplary UPnP implementation of the device connectivity architecture 100, FIG. 7 shows a simple example 700 of two personal computers (PC A 710 and PC B 711). In this example, PC A operates as the UPnP device, and PC B is the control point. Both PCs support IPv4 and IPv6, each has two Network Interface Cards (NICs) 720–723, and both are on the same network 740. NICs 1 and 2 belong to PC A and NiCs 3 and 4 to PC B. More specifically, the PCs can be two laptops in a corporate network 740, each with an 802.3 and an 802.11 NIC, where 802.3 NICs are plugged into the hub 730.

During the initialization process (as shown in FIG. 6 and described above), three distinct types of addresses interesting for UPnP are associated with each NIC: an IPv4 address, a Link-Local IPv6 address and a Site-Local IPv6 address. If there are multiple addresses of each type, UPnP randomly select one in each type. For NIC 1, they are labeled v4 1, v6LL 1 and v6SL 1, in this example; for NIC 2 they are labeled v4 2, v6LL 2 and v6SL 2 and so on.

A further step in the initialization process is selection of addresses to be used for UPnP. The selection is done depending on the host and network configuration. Following are several variations.

Default Configuration

The default configuration includes only Link-Local addresses across all active NICs. For this example, PC A 710 includes v4 1, v6LL1, v4 2 and v6LL 2 addresses. The network location signature is computed based on these 4 addresses, and the NLS field carries this same signature until any of these four addresses change. Since the UPnP network configuration includes only the v4 and link local addresses, changes in other addresses, such as site-local and global do not affect the NLS value.

PC A—The Device

After initialization, the device residing on PC A sends announcements out on both NICs and on both IPv4 and IPv6 stacks. In particular, PC A sends announcements of its IPv4, IPv6 link local for NIC 1 out of NIC1.

For the IPv4 announcement, PC A in this example sends the following advertisement. The SSDP LOCATION header of the announcement contains a URL using the literal IPv4 address. The NLS extension header field contains a network location signature (X), which is a 128-bit hash of all active addresses for the chosen scope and for the chosen NICs, including the addresses: v4 1, v6LL 1, v4 2, and v6LL 2.

Packet I: Example advertisement for the device out of NIC1:
  NOTIFY * HTTP/1.1
  HOST: Multicast Address:1900
  CACHE-CONTROL: max-age=1600
  LOCATION: http://v4 1:80/desc.xml
  NLS: X
  NT: search target
  NTS: ssdp:alive
  SERVER: OS/version UPnP/1.0 product/version
  USN: advertisement UUID For an IPv6 announcement, PC A in this example sends the following advertisement. The SSDP LOCATION header contains the location of the device URL, using the v6LL 1 address. The NLS header again contains the same network location signature (X), the 128-bit hash of all active addresses for the chosen scope and for the chosen NICs, including: v4 1, v6LL 1, v4 2 and v6LL 2 addresses.

Packet II: Example advertisement for the device out of NIC1:
  NOTIFY * HTTP/1.1
  HOST: Multicast Address:1900
  CACHE-CONTROL: max-age=1600
  LOCATION: http://[v6LL 1]:80/desc.xml
  NLS: X
  NT: search target
  NTS: ssdp:alive
  SERVER: OS/version UPnP/1.0 product/version
  USN: advertisement UUID PC A in this example also sends announcements out of NIC2 721. For an IPv4 announcement, PC A send the following advertisement. The SSDP LOCATION header contains a URL using the literal IPv4 address. The NLS header also contains the same network location signature (X), the 128-bit hash of all active addresses for the chosen scope and for the chosen NICs, including v4 1, v6SL 1, v4 2 and v6 2 addresses.

Packet III: Example advertisement for the device out of NIC2:
  NOTIFY * HTTP/1.1
  HOST: Multicast Address:1900
  CACHE-CONTROL: max-age=1600
  LOCATION: http://v4 2:80/desc.xml
  NLS: X
  NT: search target
  NTS: ssdp:alive
  SERVER: OS/version UPnP/1.0 product/version
  USN: advertisement UUID For an IPv6 announcement on NIC2, PC A sends the following advertisement. The SSDP LOCATION header contains the location of the device URL: v6LL2. The NLS header contains yet again the same signature X.

Packet IV: Example advertisement for the device out of NIC2:
  NOTIFY * HTTP/1.1
  HOST: Multicast Address:1900
  CACHE-CONTROL: max-age=1600
  LOCATION: http://[v6LL 2]:80/desc.xml
  NLS: X
  NT: search target
  NTS: ssdp:alive
  SERVER: OS/version UPnP/1.0 product/version
  USN: advertisement UUID PC B—The Control Point Because PC B also is connected on the same network segments and uses both IPv4 and IPv6 protocol stacks, the Control Point (CP) on PC B receives all four announcements from PC A. Since all packets contain the same USN and the same network location signature, the control point determines that these are just different announcements for the same device coming from different network links. If any of the addresses on PC A change, PC A recomputes the signature and sends new announcements of its active addresses.

6. Computing Environment

The above described techniques for resolving multicast messaging ambiguities for dual-stack/multi-homed devices in the device connectivity architecture 100 (FIG. 1) can be performed on any of a variety of networked computing devices, including audio/video or other multimedia recording/transmitting/receiving/or presenting devices (broadcast receivers, televisions, video players, cameras, etc.), computers (personal, workstation, server, handheld, laptop, tablet, or other mobile), telephones, office equipment (printers, copiers, scanners, fax), security systems, home appliances (lighting, heating, ventilation, air conditioning, door openers, kitchen appliances, etc.), as a few general examples. The techniques for multicast messaging using a network location signature for device connectivity can be implemented in hardware circuitry, as well as in device connectivity and networking software 880 executing within a computer or other computing environment, such as shown in FIG. 8.

Figure 8:
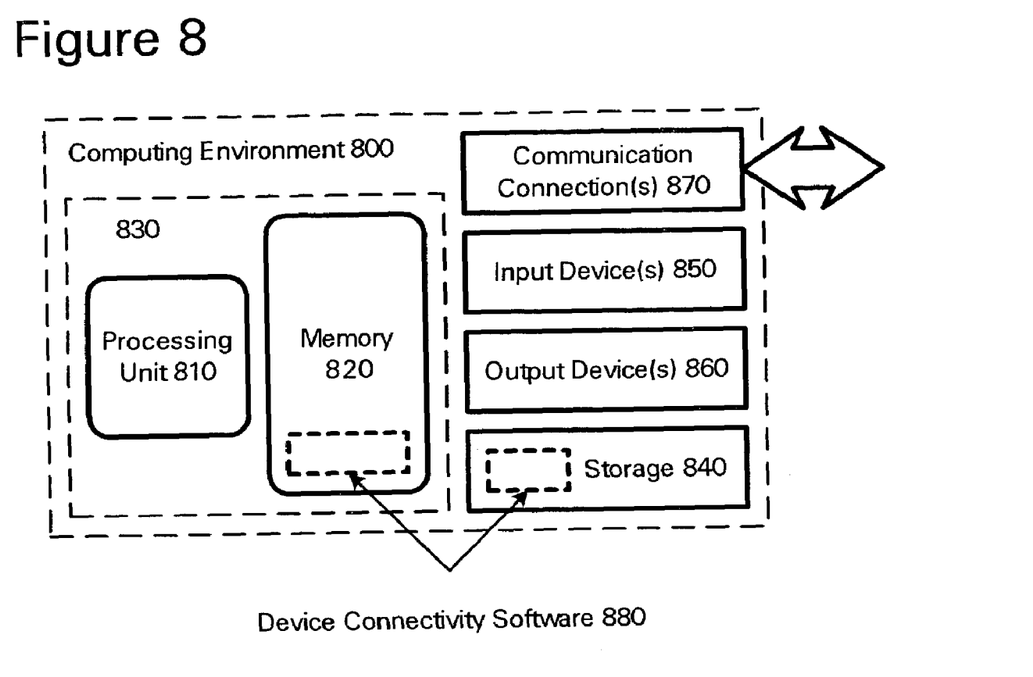
FIG. 8 is a block diagram of a suitable computing device environment for devices in the network device architecture of FIG. 1.

FIG. 8 illustrates a generalized example of a suitable computing environment 800 in which the described techniques can be implemented. The computing environment 800 is not intended to suggest any limitation as to scope of use or functionality of the invention, as the present invention may be implemented in diverse general-purpose or special-purpose computing environments.

With reference to FIG. 8, the computing environment 800 includes at least one processing unit 810 and memory 820. In FIG. 8, this most basic configuration 830 is included within a dashed line. The processing unit 810 executes computer-executable instructions and may be a real or a virtual processor. In a multi-processing system, multiple processing units execute computer-executable instructions to increase processing power. The memory 820 may be volatile memory (e.g., registers, cache, RAM), non-volatile memory (e.g., ROM, EEPROM, flash memory, etc.), or some combination of the two. The memory 820 stores software 880 implementing the device connectivity and networking protocols, including the multicast messaging using the network location signature.

A computing environment may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The storage 840 may be removable or non-removable, and includes magnetic disks, magnetic tapes or cassettes, CD-ROMs, CD-RWs, DVDs, or any other medium which can be used to store information and which can be accessed within the computing environment 800. The storage 840 stores instructions for the device connectivity and networking software 880.

The input device(s) 850 (e.g., for devices operating as a control point in the device connectivity architecture 100) may be a touch input device such as a keyboard, mouse, pen, or trackball, a voice input device, a scanning device, or another device that provides input to the computing environment 800. For audio, the input device(s) 850 may be a sound card or similar device that accepts audio input in analog or digital form, or a CD-ROM reader that provides audio samples to the computing environment. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The device connectivity and messaging techniques herein can be described in the general context of computer-readable media. Computer-readable media are any available media that can be accessed within a computing environment. By way of example, and not limitation, with the computing environment 800, computer-readable media include memory 820, storage 840, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of disambiguating device announcements in a device connectivity architecture, comprising:
    at a networked computing device operating as a controlled device in the device connectivity architecture and interfacing with at least one data network link, generating a signature value associated with a current network configuration of the networked computing device;
    for plural addresses of the networked computing device, producing messages for announcing the respective addresses according to a message structure having a signature field for containing the signature value; and
    multicasting the messages announcing the connected device at the respective addresses including the signature value in the signature field onto the at least one data network link.

2. The method of claim 1 wherein the message structure further has a field for a device identifier, the method further comprising:
    generating a device identifier of the controlled device; and
    including the device identifier in the field therefor of the multicast messages.

3. The method of claim 1 wherein the generating a signature value comprises generating the signature value as a hashing function of a set of addresses per the network configuration.

4. The method of claim 1 wherein the generating a signature value comprises generating the signature value as a globally unique identifier.

5. The method of claim 1 further comprising:
changing the signature value upon a change to the network configuration of the networked computing device operating as the controlled device;
again multicasting messages announcing respective of the networked computing device addresses, including the changed signature value in the signature field.

6. The method of claim 5 further comprising;
at a second networked computing device operating as a control point in the device connectivity architecture, receiving via the at least one data network link an initial multicast message from the networked computing device operating as the controlled device;
creating a cache entry for the controlled device at the second networked computing device operating as the control point, the cache entry containing the address announced for the controlled device in the initial multicast message;
upon receiving a further multicast message announcing the controlled device from the networked computing device operating as the controlled device at the second networked computing device operating as the control point and having the changed signature value in the signature field of the further multicast message, replacing the cache entry containing the address announced in the initial multicast message at the second networked computing device operating as the control point with a cache entry containing an address announced for the controlled device in the further multicast message.

7. The method of claim 6 further comprising;
upon receiving another multicast message announcing the controlled device from the networked computing device operating as the controlled device at the second networked computing device operating as the control point and having the same signature value in the signature field of the further multicast message, retaining the cache entry containing the address announced in the initial multicast message at the second networked computing device operating as the control point.

8. A tangible computer readable medium having a software program stored thereon for executing on a dual stack and/or multi-homed computing device connected on a data network link to cause the device to perform a method comprising:
generating a signature value associated with a current network configuration of the networked computing device;
for plural addresses of the device, producing messages for announcing respective of the addresses according to a message structure having a signature field for containing the signature value; and
multicasting the messages announcing the respective addresses including the signature value in the signature field onto the at least one data network link.

9. The computer readable medium of claim 8 wherein the message structure further has a field for a device identifier, the method further composing:
generating a device identifier of the device; and
including the device identifier in the field therefor of the multicast messages.

10. The computer readable medium of claim 8 wherein the generating a signature value comprises generating the signature value as a hashing function of a set of addresses per the network configuration.

11. The computer readable medium of claim 8 wherein generating a signature value comprises generating the signature value as a globally unique identifier.

12. The computer readable medium of claim 8 wherein the method further comprises:
changing the signature value upon a change to the network configuration of the networked computing device operating as the controlled device;
again multicasting messages announcing respective of the networked computing device addresses, including the changed signature value in the signature field.

13. A tangible computer readable medium having a software program stored thereon for executing on a dual stack and/or multi-homed computing device connected on a data network link to cause the device to perform a method comprising:
receiving via the at least one data network link an initial multicast message from another device, the multicast message containing a network configuration signature value in a signature field and an address of the other device;
creating a cache entry for the other device to contain the address from the initial multicast message;
upon receiving a further multicast message from the other device containing a changed signature value in the signature field of the further multicast message, replacing the cache entry containing the address from the initial multicast message with a cache entry containing an address from the further multicast message.

14. The computer readable medium of claim 13 wherein the method further comprises:
upon receiving another multicast message from the other device having the same signature value in the signature field of the other multicast message, retaining the cache entry containing the address from the initial multicast message.

15. A dual-stack and/or multi-homed device for operating in a network as a controlled device according to a device connectivity architecture potentially containing other dual-stack and/or multi-homed devices as control points, the device comprising:
at least one network interface for communicating on at least one network link;
at least one networking protocol stack for communicating on the at least one network interface according to a respective networking protocol;
a memory containing device connectivity programming; and
a processor for executing the device connectivity programming,
wherein executing the device connectivity programming causes the device to generate a signature value representing a network configuration of the device, and to multicast plural announcements of different addresses of the device onto the at least one network link using the at least one networking protocol stack and at least one network interface, where the multicast announcements have a signature field containing the signature value.

16. The device of claim 15 wherein executing the device connectivity programming further causes the device to regenerate the signature value upon a change in the network configuration of the device, and to multicast further plural announcements of the device's addresses with the regenerated signature value in the signature field.

17. A dual-stack and/or multi-homed device for operating in a network as a control point according to a device connectivity architecture potentially containing other dual-stack and/or multi-homed devices as controlled devices, the device comprising:

at least one network interface for communicating on at least one network link;

at least one networking protocol stack for communicating on the at least one network interface according to a respective networking protocol;

a memory containing device connectivity programming; and a processor for executing the device connectivity programming, wherein executing the device connectivity programming causes the device to process announcements from controlled devices received over the at least one network link using the at least one networking protocol stack and at least one network interface, which announcements contain an address for the controlled device and a signature field with a network location signature value; to store cache entries containing the addresses from the announcements; and upon processing a subsequent announcement received from a same controlled device as a previous announcement, to replace the cache entry stored for the same controlled device with a cache entry containing the address from the subsequent announcement and otherwise retaining the cache entry for the same controlled device containing the address from the previous announcement.

* * * * *